United States Patent Office 2,864,826
Patented Dec. 16, 1958

2,864,826

S-(O,O-DIALKYL PHOSPHORODITHIOATES) OF DIOXENETHIOL, THIOXENETHIOL AND DITHIENETHIOL

William R. Diveley, Newark, Del., assignor to Hercules Powder Company, Wilmington, Del., a corporation of Delaware No Drawing. Application August 10, 1956
Serial No. 603,246

10 Claims. (Cl. 260—327)

This invention relates to new and useful organic dithiophosphate compounds and to pesticidal compositions containing the same.

In accordance with the present invention, it has been found that novel insecticidally active organic dithiophosphate compounds of the formula:

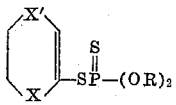

in which X and X' are selected from the group consisting of sulfur and oxygen, and R is a lower alkyl group, are produced by converting a compound of the formula

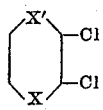

to a compound of the formula

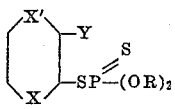

hereinafter referred to as an "intermediate," in which Y is selected from the group consisting of chlorine and

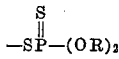

and subsequently splitting out HY from said intermediate.

In producing the products of this invention the intermediates from which HY is split out are treated differently according to the nature of Y. When Y is chlorine, the intermediate is subjected to dehydrohalogenation, and when Y is

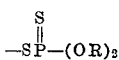

the intermediate is subjected to pyrolysis. In the pyrolysis reaction either

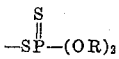

group may be split out.

The novel insecticidally active compositions of this invention having the formula

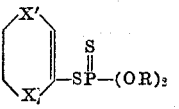

in which X, X' and R represent groups as set forth above are all produced by the process in which the intermediate is one in which Y is chlorine and the intermediate is subjected to dehydrohalogenation.

However, certain of the compounds produced in accordance with this invention are also produced by pyrolyzing compounds of the formula

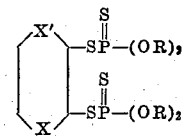

in which X and X' are sulfur or oxygen and R is a lower alkyl group. Moreover, when X' and X are different, compounds believed to have the formula

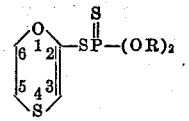

are produced free of the other position isomer only by the process of the present invention in which a 2,3-bis-phosphorodithioate is subjected to pyrolysis.

All these organic dithiophosphate compounds have pesticidal properties and are distinguished from known pesticidal compounds in being more toxic at low concentrations toward certain pests.

The method of carrying out the preparation of the products of this invention and of using the same as insecticides is more particularly described in the following examples in which all parts and percentages are by weight.

Example 1

To a solution of 45 parts of dichloro-p-dioxane in 100 parts of benzene containing 0.2 part of anhydrous zinc chloride at reflux was added 30 parts of diethyl dithiophosphoric acid. Nitrogen was bubbled through the solution and the off-gas passed through standard base. After 40 minutes one mole of hydrogen chloride was liberated per mole of diethyl dithiophosphoric acid used. After 7 hours 1.7 moles were liberated. The reaction mixture was then washed with water to remove the catalyst and hydrolyze the excess dichloro-p-dioxane, and then with base to remove acids. After additional water-washing, the product was dried and solvent was removed by distillation to a pot temperature of 80° C./0.1 mm. pressure. The residue, 44 parts, contained 75% 2-p-dioxenethiol S-(O,O-diethyl phosphorodithioate).

Forty parts of this material was distilled to give 11 parts of distillate, B. P. 136–142° C./0.3–0.5 mm. pressure.

An emulsifiable concentrate of the distillate was made by mixing 1 g. of the distillate with 1 ml. benzene and 1 ml. sorbitan monolaurate polyoxyalkylene derivative (Tween 20). This concentrate was then diluted with water to form dispersions of the distillate in water varying in concentration from 1.0% to 0.00025%. The dispersions were then tested for their toxicity to caged insects and to mites not only by spraying the insects but by spraying the plants alone as well for the purpose of determining residual toxicity. Standard test methods were used for obtaining the results below.

Tests showed that a 0.1% emulsion of the composition of this example produced a 100% kill of pea aphids when sprayed on pea plants infested with pea aphids.

Tests against the two-spotted mite showed 100% kill with a 0.025% emulsion.

Example 2

The reaction in Example 1 was repeated, but with the modification that after 1 mole of hydrogen chloride was liberated per mole of diethyl dithiophosphoric acid, the reaction mixture was cooled, washed with water, then with 10% aqueous base, and then with water and dried over anhydrous $CaSO_4$. Removal of solvent at 80°

C./0.1 mm. pressure left a residue of 30 parts which contained 45% of 2-p-dioxenethiol S-(O,O-diethyl phosphorodithioate).

The toxicity of this product was less than that of Example 1 but was surprisingly high considering the lower content of 2-p-dioxenethiol S-(O,O-diethyl phosphorodithioate).

*Example 3*

The process of Example 1 was repeated using O,O-dimethyl dithiophosphoric acid in place of O,O-diethyl dithiophosphoric acid. The product gave good insecticidal results against mites, although lower than those given by the product of Example 1.

*Example 4*

The process of Example 1 was repeated using O,O-diisopropyl dithiophosphoric acid in place of O,O-diethyl dithiophosphoric acid. This material gave insecticidal results against mites comparable to that of the product of Example 2.

*Example 5*

To 47 parts dichloro-p-thioxane in 100 parts benzene containing 0.2 anhydrous zinc chloride dissolved therein was added 30 parts of 95% diethyl dithiophosphoric acid. The mixture was heated under reflux at about 80° C. and 1 molecular equivalent of hydrogen chloride was evolved in 20 minutes. By continuing to heat in the presence of zinc chloride at 80° C., the initially formed chloro-p-thioxanethiol S-(O,O-diethyl phosphorodithioate) was dehydrohalogenated. After 7½ hours heating, a total of 1.85 molecular equivalents of hydrogen chloride had evolved. The benzene solution was then washed with water and subsequently with 5% sodium hydroxide and finally dried over calcium sulfate. After distilling off the benzene there was obtained 51 parts of a mixture of 2- and 3-p-thioxenethiol S-(O,O-diethyl phosphorodithioate) of 90% purity which was separable into its components by chromatography. Its toxicity in emulsion form was substantially equal to that of the product of Example 1 toward mites.

*Example 6*

To 24 parts of dichloro-p-dithiane in 100 parts benzene containing 1.0 part anhydrous zinc chloride dissolved therein was added 20 parts 95% diethyl dithiophosphoric acid. The mixture was heated under reflux at about 80° C. for 15 minutes during which time 1 molecular equivalent of hydrogen chloride was evolved. Heating was continued for 4 hours to cause the initially-formed chloro-p-dithianethiol S-(O,O-diethyl phosphorodithioate) to be dehydrohalogenated. At the end of this time dehydrohalogenation was 70% complete. The resulting product was washed first with water, then with 5% caustic solution and was then dried over calcium sulfate. After distilling off the benzene, there was obtained 29 parts of p-dithienethiol S-(O,O-diethyl phosphorodithioate) of about 90% purity. Its toxicity in emulsion form was substantially the same as the product of Example 1 toward mites.

*Example 7*

A sample of 2,3-p-dioxanedithiol S,S-bis(O,O-diethyl phosphorodithioate) amounting to 51 parts was heated gradually to 162° C. at 0.2 mm. pressure during which time 42.2 parts of distillate was collected. This distillate on further distillation yielded a fraction boiling at 118–132° C. (0.25 mm.) which by chromatographic purification yielded as a pure product 2-p-dioxenethiol S-(O,O-diethyl phosphorodithioate) which analyzed: C, 35.4%; H, 5.9%; S, 23.8%.

An emulsifiable concentrate was made by mixing 1 g. of the pure product of this example with 1 ml. benzene and 1 ml. sorbitan monolaurate polyoxyalkylene derivative (Tween 20). This concentrate was then diluted with water to form dispersions of the residue in water varying in concentration from 1.0% to 0.005%. The dispersions were then tested for their toxicity to caged insects and to mites not only by spraying the insects but by spraying the plants alone as well for the purpose of determining residual toxicity. Standard test methods were used for obtaining the results set forth below.

When pea aphids were sprayed with a 0.1% emulsion of the composition of this example and placed on pea seedlings sprayed simultaneously with the same emulsion, there resulted 100% mortality in 48 hours.

Activity tests were also run by spraying lima bean seedlings infested with two-spotted mites to run off with 0.005% aqueous emulsion. There resulted 100% mortality to the mites after 5 days.

A 0.1% dispersion of the toxicant gave a 100% kill of Mexican bean beetles in standard tests.

*Example 8*

A sample of 2,3-p-thioxanedithiol S,S-(O,O-diethyl phosphorodithioate) amounting to 36.5 parts was heated gradually to 150° C. at 0.5 mm. pressure during which time some gas was evolved and 13.8 parts distillate was collected. The distillate consisting mostly of diethyl dithiophosphoric acid was discarded. The residue amounting to 15 parts was crude 2-p-thioxenethiol S-(O,O-diethyl phosphorodithioate) which analyzed: S, 35.6%; P, 11.0%. Calcd. values: S, 33.6%; P, 10.9%.

This residue was tested for toxicity in the form of emulsions as in Example 1. A 0.1% emulsion of the toxicant gave 100% kill of Mexican bean beetles, a 0.025% emulsion gave 100% kill of pea aphids, and a 0.005% emulsion gave a 100% kill of two-spotted mites.

*Example 9*

A sample of 2,3-p-dithiandedithiol S,S-bis(O,O-diethyl phosphorodithioate) amounting to 35 parts and hydroquinone amounting to 0.5 part was heated gradually from 72° C to 150° C. at 0.05–0.15 mm. pressure, in the course of which treatment 16 parts of distillable material consisting mostly of diethyl dithiophosphoric acid was separated. The residual material amounted to about 17 parts.

The residual material when tested as in Example 1 as a toxicant gave 100% kill against Mexican bean beetles, pea aphids, and two-spotted mites at 0.1%, 0.025% and 0.005% emulsion concentration, respectively.

Further tests on other dialkyl dithiophosphates of 2,3-p-dioxanedithiol, 2,3-p-thioxanedithiol and 2,3-p-dithianedithiol indicate that the pyrolysis to dialkyl dithiophosphates of 2-p-dioxenethiol, 2-p-thioxenethiol and 2-p-dithienethiol, respectively, is a general reaction not dependent on the number of carbon atoms in the alkyl group. However, the insecticidal activity is at a maximum when the alkyl groups are methyl or ethyl and drops off rapidly for alkyl groups of molecular weight greater than about 57 which corresponds to a 4 carbon chain.

The process of this invention consists in the production of an intermediate of the formula

which, when Y is chlorine, is subjected to dehydrohalogenation, and which, when Y is

is subjected to pyrolysis in order to produce the insecticidal products of the invention. The intermediate is produced by reaction of 2,3-dichloro-p-dioxane, 2,3-dichloro-p-thioxane or 2,3-dichloro-p-dithiane with 1 or 2 moles of an O,O-dialkyl dithiophosphoric acid

or its salts. When the heterocyclic ring is symmetrical, i. e., X' and X are the same, there is produced as the intermediate for this invention only one isomer in the reaction with the O,O-dialkyl dithiophosphoric acid, and the intermediate on dehydrohalogenation, in the case where it contains chlorine, produces the same product as the intermediate in which two dialkyl phosphorodithioate groups are present does on pyrolysis. However, when the heterocyclic ring is unsymmetrical, i. e., X' and X are different, the intermediate formed by reaction of one mole of

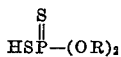

with the 2,3-dichloro-p-thioxane is a mixture of 2-chloro-p-thioxane-3-thiol S-(O,O-dialkylphosphorodithioate) and 3-chloro-p-thioxane-2-thiol S-(O,O-dialkylphosphorodithioate) and this mixture of the two position isomers on dehydrohalogenation produces a mixture of 2-p-thioxenethiol S-(O,O-dialkylphosphorodithioate) and 3-p-thioxenethiol S-(O,O-dialkylphosphorodithioate). On the other hand, the intermediate formed by reaction of two moles of

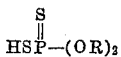

with the dichloro-p-thioxane is a single position isomer which produces only a p-thioxenethiol S-(O,O-dialkylphosphorodithioate) on pyrolysis. This latter is believed to be a 2-p-thioxenethiol S-(O,O-dialkylphosphorodithioate).

The process of producing the intermediate by reaction of the dialkyl dithiophosphoric acid with the compounds of the formula

requires the reaction of only one chlorine in the molecule to produce the intermediate in which Y is chlorine and the reaction of two chlorines to produce the intermediate in which Y is

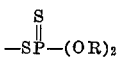

To produce the former, the dichloro compound is preferably kept in excess by gradual addition of the dialkyl dithiophosphoric acid to the reaction mixture. To produce the latter, the dialkyl dithiophosphoric acid is by analogous technique kept in excess. This replacement reaction takes place at about 30–110° C. The dialkyl dithiophosphoric acid may be reacted in the form of the free acid or in the form of a salt. The reaction may be carried out using a pyridine, ammonium, alkali metal, zinc, tin, or iron salt of the dialkyl dithiophosphoric acid to speed up the reaction. Similarly, catalysts such as zinc chloride, ferrous chloride, tin chloride, iron, tin, or zinc powder may be used to facilitate reaction of the dialkyl dithiophosphoric acid when the free acid is used. Metal salts of the dialkyl dithiophosphoric acid also are helpful in aiding the reaction at lower temperatures when the metals are any of the above-mentioned metals. In general, the metals which are useful as catalysts are those which form benzene soluble salts of the dialkyl dithiophosphoric acid.

The reaction of the dichloro-p-thioxane, dichloro-p-dioxane or dichloro-p-dithiane with the dialkyl dithiophosphoric acid to form the intermediate is carried out in nonaqueous media because of the sensitivity of the dichloro compound to hydrolysis. Organic solvents are desirable to aid in control of the reaction. Suitable solvents include benzene, toluene, xylene, acetone, anhydrous alcohol, carbon tetrachloride and dioxane. It is preferable to use an aromatic hydrocarbon solvent or acetone as the solvent when using an amine salt of the dithiophosphoric acid ester or when using an amine or ammonia as a sequestering reagent. After the reaction is complete, the solvent is readily removed by distillation.

When the diester of dithiophosphoric acid is used as the free acid in the reaction with the dichloro-p-dioxane, dichloro-p-dithiane or dichloro-p-thioxane, hydrogen chloride which is liberated may be sequestered by adding a material to combine with the hydrogen chloride as formed. It is convenient to use pyridine for this purpose. However, in its place other tertiary organic amines may be used, and they may be added in equivalent amount at the beginning of the reaction or gradually during the course of the reaction. Likewise, the amine can be reacted with the diester of the dithiophosphoric acid prior to carrying out the reaction with the dichloro-p-dioxane, dichloro-p-dithiane or dichloro-p-thioxane. Amines which can be used include pyridine, tertiary alkyl amines such as trimethyl amine, tributyl amine, triamyl amine, dimethyl aniline and the like. Inorganic bases may also be used. These include ammonia, alkali metal hydroxides, carbonates and bicarbonates, and alkaline earth metal hydroxides and carbonates. When any of these reagents is used, the same reagent may be used to effect dehydrohalogenation by use of the proper temperature for a suitable length of time.

As in the case of organic bases, the inorganic bases may also be used first to form a salt of the ester of the dithiophosphoric acid for carrying out the first step to form the intermediate. When the salt of the ester of dithiophosphoric acid is used as the reactant, it is preferable to use a salt which is soluble in the organic solvent used for the reaction. The organic salts of amines are particularly satisfactory because of the good solubility of these salts in the nonreactive aromatic hydrocarbon solvents. When the free acid is reacted with the dichloro-p-dioxane, dichloro-p-thioxane or dichloro-p-dithiane, the alkaline material is preferably added gradually as needed but it can be added all at once if desired. Ammonia is suitably added gradually as a gas; the solids are suitably added in finely divided form.

The dithiophosphoric acid ester is produced by reacting the lower aliphatic alcohol, which is to form a part of the ester, with $P_2S_5$ preferably in a nonreactive solvent such as benzene, toluene, xylene, or carbon tetrachloride and removing the $H_2S$ which is liberated. The reaction is carried out at any temperature in the range of 50° to 120° C., selecting the lowest practical temperature without decomposition. If different radicals are desired for the various R radicals, a mixture of alcohols may be used in the production of the dithiophosphoric acid ester. Likewise, dithiophosphoric acid esters produced from different alcohols can be mixed for use in the reaction with the dichloro-p-thioxane, dichloro-p-dithiane, or dichloro-p-dioxane. The esters of dithiophosphoric acid used in preparation of the compounds of this invention are thus made from individual alcohols or mixtures of alcohols having 1–4 carbon atoms. Included among such alcohols are: methanol, ethanol, propanol-1, propanol-2, 2-methyl propanol-1, butanol-1 and butanol-2.

The dehydrohalogenation of the intermediate in which Y is chlorine is carried out by any of the well known dehydrohalogenation processes which do not require temperatures above about 160° C. (where some decomposition or polymerization of the product takes place. Thus, dehydrohalogenation may be effected by heating with tertiary amines such as pyridine, quinoline, dimethyl aniline, trimethyl amine and the like or by contacting with aqueous solutions of alkaline materials such as aqueous ammonia, aqueous amines, aqueous alkali metal hydroxides, carbonates, bicarbonates, acetates or other salts of weak acids. Dehydrohalogenation also takes place when the reaction mixture of the intermediate in which Y is chlorine subsequent to its preparation is further heated while driving off the liberated hydrogen chloride as by sparging with a gas or by distilling with an inert solvent to carry off the hydrogen chloride. Temperatures broadly from 0–160° C. are operable for dehydrohalogenation but temperatures in the range of 50–80° C. are preferred when tertiary amines are used, 20–30° C. when aqueous alkalies are used, and 60–120° C. when the reaction mixture subsequent to the preparation of the intermediate is heated to drive off the hydrogen chloride.

The pyrolysis is carried out by heating the intermediate of the general formula set forth above in which Y is a dialkyl phosphorodithioate group at a temperature which causes elimination of a dialkyl dithiophosphoric acid residue without further decomposition or polymerization of the unsaturated toxic product. Temperatures which are particularly effective are those in the range of about 100° C. to about 160° C.

In the pyrolysis reaction, solvents may be present if desired. Suitable solvents include: p-cymene, o-dichlorobenzene, nitrobenzene, chlorobenzene, benzene and xylenes.

The pyrolysis may be carried out at reduced or elevated pressures and an autoclave may be used when solvents are present to avoid loss of solvent. In the course of the pyrolysis, the solvents as well as the dialkyl dithiophosphoric acid may be distilled off or the dialkyl dithiophosphoric acid may be reacted with salt-forming neutralizing agents.

The O,O-dialkyl dithiophosphoric acid eliminated in the pyrolysis reaction may be reused if desired either by recovery for use in making more of the initial reactant or the O,O-dialkyl dithiophosphoric acid may be used in the reaction mixture for reaction with 2,3-dichloro-p-dioxane, 2,3-dichloro-p-dithiane or 2,3-dichloro-p-thioxane for the production of more pyrolyzable reagent which may either be pyrolyzed or left in to provide a mixture of insecticidal toxicants.

To avoid polymerization of the products of this invention during the dehydrohalogenation or pyrolysis process, the reaction mixture should be held at elevated temperatures for as short a time as possible or preferably, an effective amount of a polymerization inhibitor is used. Polymerization inhibitors which are effective are: hydroquinone, resorcinol and p-tertiary-butyl catechol. The amount of inhibitor used is generally less than about 5% and is preferably in the range of 0.1% to 1%.

Since the conditions for the preparation of the intermediate and its dehydrohalogenation or pyrolysis are the same in part of the range, it is possible to carry out both steps at the same time, in which case the steps actually are believed to be successive, and to avoid an isolation or purification of the intermediate.

The compounds of this invention are used as the sole toxic agent in pesticidal formulations or in admixture with other toxicants for modification of the properties of the individual toxicants. They may be used, for example, in admixture with toxaphene, DDT, Thanite, chlordane, rotenone, pyrethrum and the like in many of the formulations suggested below.

The compounds of this invention are made into pesticidal compositions for use against insects and mites by dilution with an insecticidal adjuvant as a carrier therefor, by dispersing in an organic solvent, or in water, or by diluting with a solid insecticidal adjuvant as a carrier. Dispersions containing a surface active dispersing agent have the advantage of spreading the toxic substance more effectively over the plant surface. Dispersions in organic solvents include dispersions in alcohols, pine oil, hydrocarbon solvents, difluorodichloromethane, and similar organic solvents. The compounds of this invention are also used in Aerosol formulations in which difluorodichloromethane and similar aerosol propellants form the propellant vehicle.

Aqueous dispersions are made up from the compounds of this invention, a surface active dispersing agent and water as the essential ingredients. The amount of the compounds of this invention in the aqueous dispersions when diluted for spraying of plants will be in the range of about 10% to about 0.001% of the aqueous dispersion.

The aqueous dispersion will ordinarily be made up from a concentrate, and the concentrate will be dispersed in water to the proper concentration for application to the plants to be treated in the field. The concentrate is composed essentially of the compound of this invention and a surface active dispersing agent. The concentrate may also contain sufficient amounts of organic solvents to aid in effective dispersion. The amount of surface active dispersing agent used is usually at least 5% of the amount of toxic compound in the concentrate.

Suitable surface-active dispersing agents for use in the compositions of this invention are those disclosed in Chemistry of Insecticides, Fungicides and Herbicides (by Donald E. H. Frear, second edition (1948), pages 280–287) for use with known insecticides and include neutral soaps of resin, alginic and fatty acids and alkali metals or alkyl amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, China clay, kaolin, attapulgite, and bentonite and related hydrated aluminum silicates having the property of forming a colloidal gel. Among the other surface-active dispersing agents which are useful in the compositions of this invention are the omega-substituted polyethylene glycols of relatively long-chain length, particularly those in which the omega substituent is aryl, alkyl, or acyl. Compositions of the toxic material and surface-active dispersing agent will in some instances have more than one surface-active dispersing agent for a particular type of utility, or in addition to a surface-active dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents.

This application is a continuation-in-part of applications Serial No. 531,605 and Serial No. 531,606, both filed on August 30, 1955, now abandoned.

What I claim and desire to protect by Letters Patent is:

1. An insecticidally active composition of matter of the formula

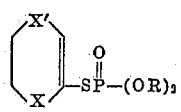

in which X' and X are selected from the group consisting of sulfur and oxygen, and R is a lower alkyl group.

2. An insecticidally active composition of matter of the formula

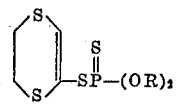

in which R is a lower alkyl group.

3. An insecticidally active composition of matter of the formula

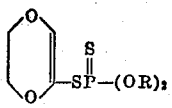

in which R is a lower alkyl group.

4. An insecticidally active composition of matter of the formula

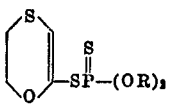

in which R is a lower alkyl group.

5. An insecticidally active composition of matter of the formula

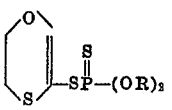

in which R is a lower alkyl group.

6. The method of producing a compound of the formula

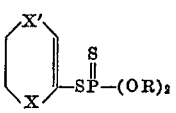

in which X and X' are selected from the group consisting of sulfur and oxygen and R is a lower alkyl group, which comprises contacting a compound of the formula

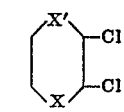

with a reagent of the group consisting of a dialkyldithiophosphoric acid and salts thereof to form an intermediate of the formula

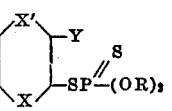

in which Y is selected from the group consisting of chlorine and

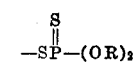

and subsequently heating said intermediate at a temperature in the range of 0–160° C. until said first named compound is produced.

7. The method of producing a compound of the formula

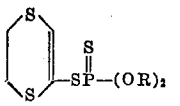

in which R is a lower alkyl group, which comprises contacting a compound of the formula

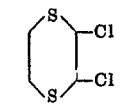

with a reagent of the group consisting of a dialkyldithiophosphoric acid and salts thereof to form an intermediate of the formula

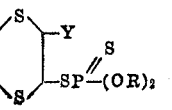

in which Y is selected from the group consisting of chlorine and

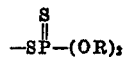

and subsequently heating said intermediate at a temperature in the range of 0–160° C. until said first named compound is produced.

8. The method of producing a compound of the formula

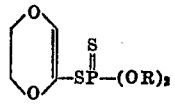

in which R is a lower alkyl group, which comprises contacting a compound of the formula

with a reagent of the group consisting of a dialkyldithiophosphoric acid and salts thereof to form an intermediate of the formula

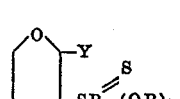

in which Y is selected from the group consisting of chlorine and

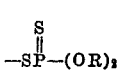

and subsequently heating said intermediate at a temperature in the range of 0–160° C. until said first named compound is produced.

9. The method of producing a compound of the formula

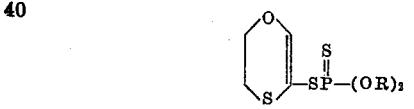

in which R is a lower alkyl group, which comprises contacting a compound of the formula

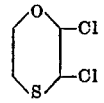

with a reagent of the group consisting of a dialkyldithiophosphoric acid and salts thereof to form an intermediate of the formula

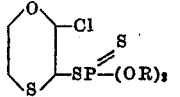

and subsequently heating said intermediate at a temperature in the range of 0–160° C. until said first named compound is produced.

10. The method of producing a compound of the formula

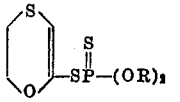

in which R is a lower alkyl group, which comprises contacting a compound of the formula:

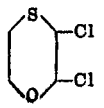

with a reagent of the group consisting of a dialkyldithiophosphoric acid and salts thereof to form and intermediate of the formula
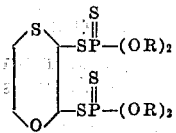
and subsequently pyrolyzing said intermediate at a temperature in the range of 100–160° C. until said first named compound is produced.
References Cited in the file of this patent
UNITED STATES PATENTS
| | | |
|---|---|---|
| 2,766,166 | Haubein | Oct. 9, 1956 |
| 2,766,167 | Haubein | Oct. 9, 1956 |